United States Patent [19]
Kuehner

[11] Patent Number: 5,814,363
[45] Date of Patent: Sep. 29, 1998

[54] PROCESS FOR PRODUCING A STERILE MILK PAP

[75] Inventor: Holger Kuehner, Muehldorf am Inn, Germany

[73] Assignee: Nestec S.A., Vevey, Switzerland

[21] Appl. No.: 358,353

[22] Filed: Dec. 19, 1994

[30] Foreign Application Priority Data

Jan. 8, 1994 [EP] European Pat. Off. .............. 94100208

[51] Int. Cl.$^6$ .............................. A23C 9/137; A23L 1/10
[52] U.S. Cl. .......................... 426/580; 426/521; 426/522; 426/618; 426/801
[58] Field of Search .................................. 426/580, 618, 426/521, 522, 801

[56] References Cited

U.S. PATENT DOCUMENTS

| | | | |
|---|---|---|---|
| 1,241,163 | 9/1917 | Stevens et al. .......................... | 426/618 |
| 3,506,447 | 4/1970 | Billerbeck et al. ...................... | 426/801 |
| 5,378,488 | 1/1995 | Dimler et al. ........................... | 426/522 |

FOREIGN PATENT DOCUMENTS

| | | |
|---|---|---|
| 1011984 | 6/1977 | Canada . |
| 115618 | 1/1919 | European Pat. Off. . |
| 2349285 | 11/1977 | France . |
| 2559035 | 9/1985 | France . |

OTHER PUBLICATIONS

Hall et al. 1968, Milk Pasteurization, Avi Publishing Co., Inc, Wesport, CN, pp. 107, 117.
Derwent Publications Ltd., Week A07, Sectio A07, Abstract 12656A/07 of Oreggia, French Patent Application Publication No. 2 349 285 (1977).
Patent Abstracts of Japan, vol. 11, No. 167 (C–425) of Masao JP–A–62 000 245 (1987).
Patent Abstracts of Japan, vol. 14, No. 548 (C–785) of Hiroshi JP–A–02 234 644 (1990).
Ostermann, Aseptic Packaging of Liquid Food With Particulates, Dairy Packaging Newsletter, 18, 1990, pp. 1–4.
Ebel, New Technology for German Rice, Food Manufacture International, vol. 3, No. 1, 1986, pp. 38–39.

*Primary Examiner*—Helen Pratt
*Attorney, Agent, or Firm*—Vogt & O'Donnell, LLP

[57] ABSTRACT

A sterile, degassed milk pap containing milk and a swollen cereal product is prepared by mixing heated milk with a cereal product to swell the cereal product during mixing, and after which, the mixture is heated further so that vegetative microbes are destroyed, the further-heated mixture is degassed to avoid oxidation of the mixture, the degassed mixture is heated under ultra-high-temperature conditions to sterilize the mixture, and then, the sterilized mixture is cooled.

15 Claims, 1 Drawing Sheet

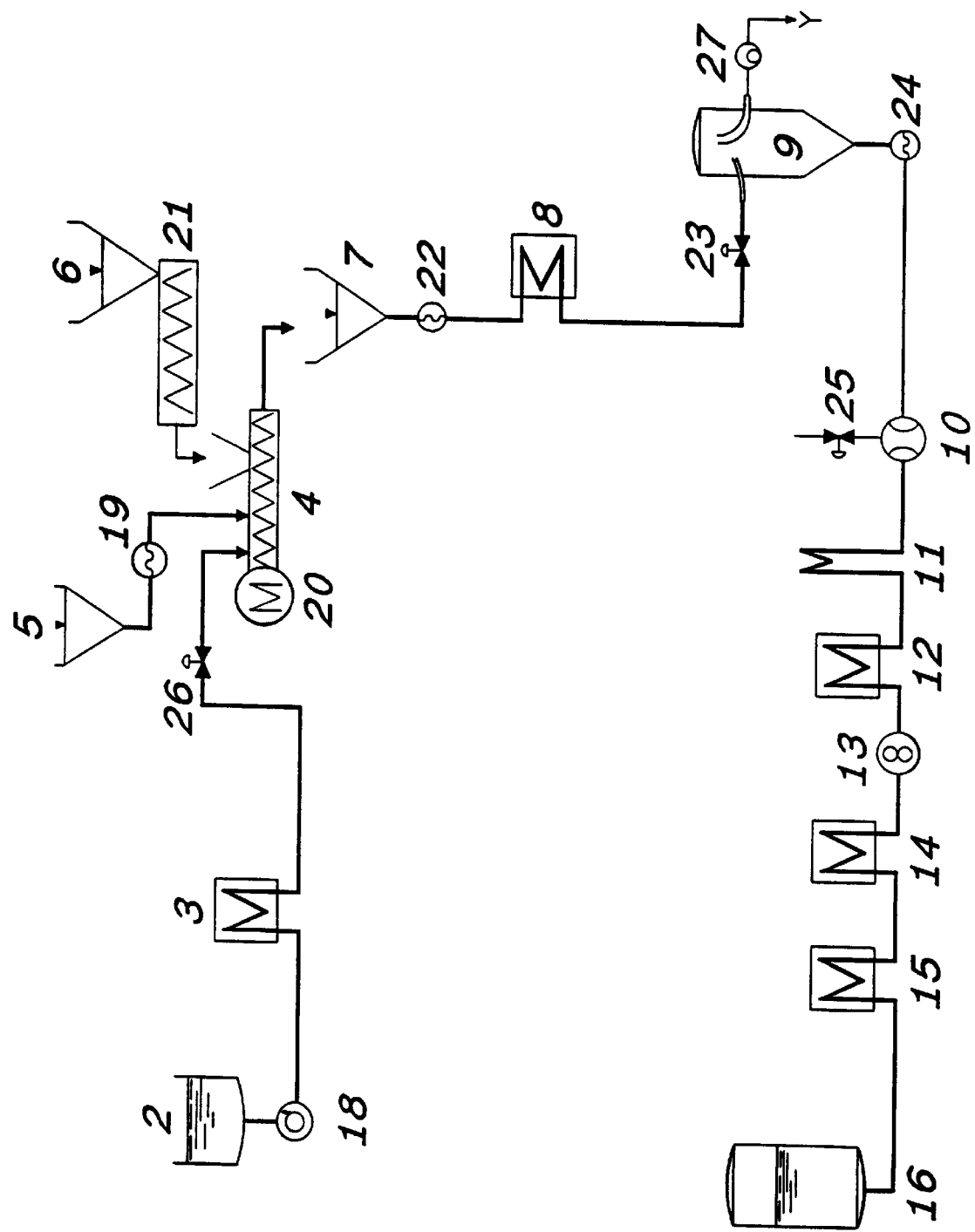

PROCESS FOR PRODUCING A STERILE MILK PAP

BACKGROUND OF THE INVENTION

The invention relates to a process for producing a directly consumable sterile milk pap in a continuous manner and the sterile milk pap obtained.

In order to produce such a milk pap currently, pregelatinized dry cereal semolina is taken and mixed with milk at a temperature of approximately 35°–40° C. A consumable product is then obtained which, in that the amount of added milk can be controlled, is flowable and spoonable. In addition, with such a product, the structure of the grains and the flavour of the pap can be ensured.

SUMMARY OF THE INVENTION

The object underlying the invention is to provide a directly consumable milk pap, this pap preserving the qualities of the above-mentioned product, i.e., is flowable and spoonable, and keeping the grain structure and a good flavour.

This object has been achieved by the development of a production process, in that this process requires a thermal treatment of the semolina in order to prepare a sterile product, i.e. which can be stored for a long time and at room temperature. The difficulty was to be able to carry out the thermal treatment as gently as possible and nevertheless to be able to produce a perfect product.

The invention relates to a process for producing a directly consumable sterile milk pap in a continuous manner, the milk being heated, this milk being mixed with at least one cereal product, the mixture obtained being subjected to a second heating, the heated mixture being degassed, subjected to a UHT (ultra-high temperature) treatment and finally cooled.

The process according to the invention gives a finished product which ensures a good flavour and retention of the texture of the cereal product grains and which may be consumed either cold or warm.

The invention further relates to a sterile milk pap product which contains between 50 and 80% milk, between 5 and 10% cereal products, between 0 and 30% fruit and between 0 and 5% sugar. The milk used is preferably whole milk which thereby supplies proteins and fats. The cereal product is a carbohydrate source, the fruit supplies a specific flavour note, and sugar gives a sweet note. Alternatively, instead of the fruit, the pap may contain chocolate or cocoa powder, or plant extracts such as vanilla extract, and the pap additionally can contain other flavourings and also vitamins, salts and unsaturated fatty acids and/or glyceride esters thereof.

This pap can be used for the nutrition of infants from 3 months old and can be stored unopened at room temperature for at least 9 months.

DETAILED DESCRIPTION OF THE INVENTION

In carrying out the process of the present invention, the milk is usually heated to a temperature between 50° and 8° C. This heating is necessary in order to ensure the protection of the end product, in order to achieve a better mixing effect and so that the grain can already swell in the mixing in order to avoid sedimentation in the line. The heating of the milk is carried out conventionally, for example using a plate heat exchanger.

The presence of the cereal product brings a texture and a certain viscosity to the pap. This cereal product is selected from the group consisting of semolina, hard wheat semolina, rice flour semolina, oatmeal and spelt flour. The particle diameter of the cereal product is between 0.4 and 1 mm.

The advantage of the process according to the invention is that a continuous procedure can be employed.

For nutritional reasons it is also preferred to add other substances to the milk, for example sugar, flavourings, sweeteners, vitamins, salts and unsaturated fatty acids and/or glyceride esters thereof. All water-soluble or fat-soluble vitamins are used as the vitamins, calcium salts and iron salts are used as the salts, and corn oil is used as the glyceride esters of unsaturated fatty acids.

In order to enhance the flavour of the pap, a fruit puree is additionally added to the cereal product. The type of fruit is not critical and can be any sort, for example banana or apricot. Instead of this fruit, it is also possible to add chocolate or cocoa powder or plant extract, such as vanilla extract.

The cereal product and fruit puree are mixed in a conventional mixer, a certain contact time with the milk having to be ensured.

After mixing, a second heating is carried out at a temperature between 95° and 110° C. The reason for this treatment is threefold: firstly, in order to permit the following degassing under atmospheric conditions, since at, for example, 70° C., it would only be possible to operate under vacuum which is absolutely unacceptable for protection of the grain; secondly, in order to guarantee prevention of sedimentation; and thirdly, in order to ensure destruction of the vegetative microbes. The heating is carried out in a classic way, for example using a tubular heater.

The mixture is then degassed at atmospheric pressure and at approximately 100° C. in order to avoid oxidation of the product. A UHT treatment at 130°–140° C. is then performed by direct heating, for example by direct injection of steam into the mixture. This solution permits a gentle thermal treatment. The UHT treatment may be carried out for from 60 to 120 seconds.

The heated mixture must then be cooled, which takes place in one or more stages. The cooling temperature is in the range from 20° to 80° C. The finished pap can either be temporarily stored or directly aseptically packaged. The product is usually packaged in jars of 150 to 300 g.

BRIEF DESCRIPTION OF THE DRAWINGS

The process according to the invention is described in more detail with reference to the accompanying schematic diagram.

DETAILED DESCRIPTION OF THE DRAWING

The raw mixture which contains all the components such as the milk, the sugar, the vitamins, the salts and the esters of fatty acids is stored in vessel 2 and is transported by the pump 18 through the plate heat exchanger 3 for heating to 70° C. The control valve 26 controls the feed of the raw mixture in order to control the level of the mixture in the temporary buffer 7. The cereal product and the fruit puree are also fed in the dynamic mixer 4 driven by motor 20. In the metering station 6, the cereal product is metered and passes through the screw feeder 21 to the mixer 4. The fruit puree is likewise fed to the mixer 4 from the metering station 5 by a pump 19.

The rotary speed of the mixer 4 is selected in such a way as to permit a sufficient contact time. The mixture is then transported from the temporary buffer 7 by a pump 22 through the tubular heater 8 in order to achieve a temperature of 105° C. The pressurizing valve 23 can ensure maintenance of the pressure. The mixture is then degassed in a degassing station 9 by a pump 27 at atmospheric pressure at 100° C. A gentle treatment is obtained in this way. The grains are already almost maximally swollen without change in texture.

The degassed mixture is then brought by a pump 24 into the steam injection system 10. A temperature of 136° C. is achieved and the control valve 25 controls the steam feed. The aseptic rotary piston pump 13 maintains the pressure upstream and forces the product downstream. The mixture is kept for 90 seconds at the above-mentioned temperature due to UHT hot-holding 11. The cooling is then carried out in three stages, in 12, 14 and 15, respectively, to temperatures of 80°, 50° and 40° C., respectively.

The finished pap is then stored in the aseptic tank 16 and can be supplied to a conventional aseptic packaging unit.

EXAMPLE

The description is described in more detail with reference to the following examples.

EXAMPLE 1
Chocolate milk-semolina pap.

A raw mixture of 75 kg of whole milk, 4.5 kg of sugar, 1 kg of corn oil, 1 kg of cocoa powder, vitamins, calcium carbonate and ascorbic acid is prepared and brought to a temperature of 70° C. 5.9 kg of hard wheat semolina are added to this. The throughput rates of the raw mixture and the cereal product selected are 1,500 1/h and 100 kg/h, respectively. The mixture is then brought to a temperature of 105° C. and degassed.

The UHT treatment is carried out at 140° C. with a hot-holding time of 90 seconds and cooling is carried out in three stages at 75°, 50° and 40° C., respectively. The product is then packaged into jars of 200 g.

A product is obtained having a semolina-like structured surface, of pasty thickness, spoonable and non-dripping.

EXAMPLE 2
Vanilla milk-semolina pap.

A raw mixture of 75 kg of whole milk, 3 kg of sugar, 1 kg of corn oil, 0.3 kg of vanilla extract, vitamins, calcium carbonate and ascorbic acid is prepared and brought to a temperature of 70° C. 6.8 kg of hard wheat semolina are added thereto. Further thermal treatment is carried out as in Example 1.

A white, slightly yellowish product is obtained having a milky fresh vanilla aroma. The texture of the grains is comparable with that of a fresh product.

EXAMPLE 3
Banana milk-semolina pap.

A raw mixture of 70 kg of whole milk, 2.7 kg of sugar, 1 kg of corn oil, 2 kg of banana juice concentrate, vitamins, calcium carbonate and ascorbic acid is prepared and brought to a temperature of 70° C. 6.5 kg of hard wheat semolina are added thereto. Further thermal treatment is carried out as in Example 1.

A product having a light beige colour, creamy, smooth, flowing and readily dripping is obtained.

I claim:

1. A process for preparing a sterile milk pap comprising mixing heated milk with a cereal product to swell the cereal product during mixing to obtain a pap preparation mixture, heating the mixture so that vegetative microbes are destroyed to obtain a heat-treated mixture, degassing the heat-treated mixture to obtain a degassed mixture to avoid oxidation of the mixture, heating the degassed mixture under ultra-high-temperature conditions to sterilize the degassed mixture to obtain a sterilized, degassed mixture and then, cooling the sterilized degassed mixture.

2. A process according to claim 1 wherein the heated milk has a temperature of between 50° C. and 80° C. and the pap preparation mixture is heated to a temperature of between 95° C. and 110° C.

3. A process according to claim 1 or 2 wherein the heat-treated mixture is degassed under atmospheric conditions at a temperature of approximately 100° C.

4. A process according to claim 3 wherein the pap preparation mixture is heated to a temperature of between approximately 100° C. and 110° C.

5. A process according to claim 11 wherein the cereal product is a cereal semolina.

6. A process according to claim 1 wherein the cereal product is selected from the group consisting of hard wheat semolina, rice flour semolina, maize semolina, oatmeal and spelt flour.

7. A process according to claim 1 wherein the cereal product has a particle diameter of between 0.4 mm and 1 mm.

8. A process according to claim 1 wherein steam is injected into the degassed mixture for heating the degassed mixture.

9. A process according to claim 1 wherein the degassed mixture is heated at a temperature of from 130° C. to 140° C. for from 60 seconds to 120 seconds.

10. A process according to claim 1 wherein the sterilized, degassed mixture is cooled to a temperature of from 80° C. to 20° C.

11. A process according to claim 1 wherein the sterilized, degassed mixture is cooled in a plurality of successive stages.

12. A process according to claim 1 wherein the heated milk and the cereal product are mixed in amounts so that the pap preparation mixture contains, by weight, between 50% and 80% milk and between 5% and 10% cereal product.

13. A process according to claim 1 further comprising mixing a substance selected from the group consisting of chocolate and cocoa powder with the heated milk and the cereal product.

14. A process according to claim 1 further comprising mixing a fruit substance with the heated milk and the cereal product.

15. A process according to claim 1 further comprising mixing at least one of a vitamin, an unsaturated fatty acid, an unsaturated fatty acid ester and a flavoring substance with the heated milk and the cereal product.

* * * * *

UNITED STATES PATENT AND TRADEMARK OFFICE
CERTIFICATE OF CORRECTION

PATENT NO. : 5,814,363
DATED : September 29, 1998
INVENTOR(S) : Holger KUEHNER

It is certified that error appears in the above-indentified patent and that said Letters Patent is hereby corrected as shown below:

Column 1, line 59, delete " 8° " and insert therefor -- 80° --.

Column 3, line 20, change " EXAMPLE " to -- EXAMPLES --.

Signed and Sealed this

Sixteenth Day of March, 1999

Attest:

Q. TODD DICKINSON

Attesting Officer

Acting Commissioner of Patents and Trademarks